US012413899B2

(12) United States Patent
Huang et al.

(10) Patent No.: US 12,413,899 B2
(45) Date of Patent: Sep. 9, 2025

(54) INTEGRATED SPEAKER AND MOBILE TERMINAL

(71) Applicant: AAC Technologies (Nanjing) Co., Ltd., Nanjing (CN)

(72) Inventors: Lei Huang, Nanjing (CN); Hongxing Wang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 242 days.

(21) Appl. No.: 18/324,180

(22) Filed: May 26, 2023

(65) Prior Publication Data

US 2024/0205592 A1 Jun. 20, 2024

Related U.S. Application Data

(63) Continuation of application No. PCT/CN2023/086800, filed on Apr. 7, 2023.

(30) Foreign Application Priority Data

Dec. 19, 2022 (CN) ......................... 202211632068.2

(51) Int. Cl.
*H04R 1/28* (2006.01)
*H04R 1/02* (2006.01)

(52) U.S. Cl.
CPC ........... *H04R 1/2811* (2013.01); *H04R 1/025* (2013.01); *H04R 1/028* (2013.01); *H04R 2499/11* (2013.01)

(58) Field of Classification Search
CPC ...... H04R 1/2811; H04R 1/025; H04R 1/028; H04R 2499/11; H04R 9/022
See application file for complete search history.

(56) References Cited

U.S. PATENT DOCUMENTS

| | | | | |
|---|---|---|---|---|
| 10,306,356 B2 * | 5/2019 | Katz | ...................... | H04R 1/345 |
| 10,841,706 B2 * | 11/2020 | Davis | ...................... | H04R 9/022 |
| 2006/0039571 A1 * | 2/2006 | Harris | .................... | H04R 9/022 381/189 |
| 2015/0023544 A1 * | 1/2015 | Chu | ........................ | H04R 9/022 381/397 |
| 2018/0152790 A1 * | 5/2018 | Dong | ....................... | H04R 9/06 |

(Continued)

FOREIGN PATENT DOCUMENTS

CN 215682545 U * 1/2022 ............... H04R 1/02

*Primary Examiner* — Oyesola C Ojo
(74) *Attorney, Agent, or Firm* — Wiersch Law Group

(57) ABSTRACT

The present application provides an integrated speaker and a mobile terminal. The integrated speaker includes a housing, a heat dissipation assembly configured to drive air and dissipate heat from the mobile terminal, and a sounding assembly configured to improve the sound performance of the mobile terminal, including a sounding driver and a cover plate. A rear cavity is formed between the cover plate and the sounding driver, and a front cavity is formed between the sounding driver and the housing. The housing is provided with a sound outlet hole connected to the front cavity, a partition plate a first and second through-holes. The sound of the sounding assembly is emitted from the sound outlet hole. The rear and front cavities are configured to improve the audio experience effect of the mobile terminal, and the housing plays the role of protecting the heat dissipation assembly and the sounding assembly.

9 Claims, 4 Drawing Sheets

(56) References Cited

U.S. PATENT DOCUMENTS

| | | | | |
|---|---|---|---|---|
| 2018/0199123 | A1* | 7/2018 | Rao | G06F 1/203 |
| 2019/0029103 | A1* | 1/2019 | MacDonald | H05K 1/0203 |
| 2021/0029426 | A1* | 1/2021 | Huang | H04R 9/022 |
| 2022/0232304 | A1* | 7/2022 | Au | H04R 1/021 |
| 2022/0337942 | A1* | 10/2022 | Li | H04R 1/2857 |
| 2023/0040924 | A1* | 2/2023 | Zhu | H04R 1/028 |
| 2023/0221771 | A1* | 7/2023 | Castro | H04M 1/04 700/275 |

* cited by examiner

A-A

INTEGRATED SPEAKER AND MOBILE TERMINAL

TECHNICAL FIELD

The present application relates to the field of speaker technologies, in particular to an integrated speaker and a mobile terminal.

BACKGROUND

With the advancement of technology, mobile terminal speakers have evolved into multiple-speaker configurations as an integral part of mobile devices.

Typically, the multi-speaker form of the mobile terminal in the related art is usually set up with speaker modules at the top and bottom of the mobile terminal respectively to form a speaker acoustic combination. However, the acoustic performance of solutions for mobile terminal speaker setups in the related art is often limited. Although adding a subwoofer module can improve acoustic performance, it conflicts with the positioning of a peripheral radiator in the mobile terminal, and it is impossible to add the peripheral radiator after adding the subwoofer module.

Therefore, it is necessary to provide an integrated speaker and a mobile terminal, which can not only enhance the audio experience effect of the mobile terminal, but also realize the heat dissipation of the mobile terminal.

SUMMARY

An objective of the present application is to provide an integrated speaker and a mobile terminal, which can not only enhance the audio experience effect of the mobile terminal, but also realize the heat dissipation of the mobile terminal.

The technical solutions of the present application are as follows: an integrated speaker, including a housing with an accommodation cavity; a heat dissipation assembly provided in the accommodation cavity; a sounding assembly provided in the accommodation cavity and spaced from the heat dissipation assembly, including a sounding driver provided in the housing; and a cover plate at least partially attached to the housing, wherein a rear cavity is formed between the cover plate and the sounding driver, and a front cavity is formed between the sounding driver and the housing; wherein the housing is provided with a sound outlet hole connected to the front cavity, and a partition plate separating the accommodation cavity into a first cavity and a second cavity; a side wall of the housing is provided with a first through-hole connected to the first cavity, and a second through-hole connected to the second cavity; the heat dissipation assembly is provided in the first cavity; the heat dissipation assembly is configured to drive air from the second cavity to the first cavity, or, the heat dissipation assembly is configured to drive air from the first cavity to the second cavity.

In one embodiment, the heat dissipation assembly includes a heat conducting plate capped at an opening of the housing, a heat dissipation member provided on the heat conducting plate and located in the first cavity, and a fan assembly provided on the heat dissipation member; wherein the heat dissipation member includes a base plate attached to the heat conducting plate and a heat dissipation structure attached to the base plate and surrounding an outer side of the fan assembly; a plurality of gaps are formed in the heat dissipation structure; and the fan assembly is configured to drive air from the second cavity to the first cavity through the plurality of gaps.

In one embodiment, the heat dissipation structure includes at least two first heat dissipation plates and at least two second heat dissipation plates, wherein the at least two first heat dissipation plates and at least two second heat dissipation plates are spaced apart and around the outer side of the fan assembly, an end of each first heat dissipation plate away from the partition plate and an end of each second heat dissipation plate away from the base plate are abutted against the partition plate.

In one embodiment, the first heat dissipation plates are staggered with the second heat dissipation plates, and the second heat dissipation plates are provided around an outer side of each first heat dissipation plate.

In one embodiment, the partition plate is provided with a third through-hole opposite to a position of the fan assembly, wherein the third through-hole is connected to the first cavity and the second cavity.

In one embodiment, the partition plate further includes a flange extending from an edge of the third through-hole towards the heat dissipation assembly, wherein an outer side of the flange is abutted against an inner side of each of the first heat dissipation plates.

In one embodiment, the cover plate is provided with a convex portion projecting towards the heat dissipation assembly and corresponding to a position of the third through-hole, and a fitting portion extending outwardly from an outer edge of the convex portion and fixed to the housing, wherein the convex portion is extended at least partially into the third through-hole.

In one embodiment, a heat conducting member is provided between the base plate and the housing, and the heat conducting member is made of heat conductive material.

In one embodiment, a first limiting slot is provided on an inner side of the housing and a second limiting slot is provided around an outer side of the first limiting slot; the sounding driver is embedded in the first limiting slot, and the cover plate is embedded in the second limiting slot.

The beneficial effect of the present application is to provide an integrated speaker on the one hand, and a mobile terminal provided with the above-mentioned integrated speaker on the other hand. In the integrated speaker of the present application, the sounding assembly and the heat dissipation assembly are provided in the housing with an accommodation cavity, so that the present application can not only increase the audio effect of the mobile terminal after being attached to the mobile terminal, but also dissipate heat from the mobile terminal. The heat dissipation assembly is configured to dissipate heat from the mobile terminal, and the sounding assembly is configured to improve the sound performance of the mobile terminal. The heat dissipation assembly drives the air through the first cavity and the second cavity to bring out the heat generated during the operation of the mobile terminal, so as to dissipate heat from the mobile terminal. When the sounding assembly is operating, the sound is emitted through the sound outlet hole, and the rear cavity and the front cavity are configured to improve the sound quality of the sounding assembly and improve the audio experience of the mobile terminal. In addition, the housing can also play a role in protecting the heat dissipation assembly and the sounding assembly, and the heat dissipation assembly and the sounding assembly sharing a housing makes the overall structure of the speaker simplified.

DETAILED DESCRIPTION OF THE EMBODIMENTS

The present application is further described below in conjunction with the accompanying drawings and embodiments.

Figure 1:
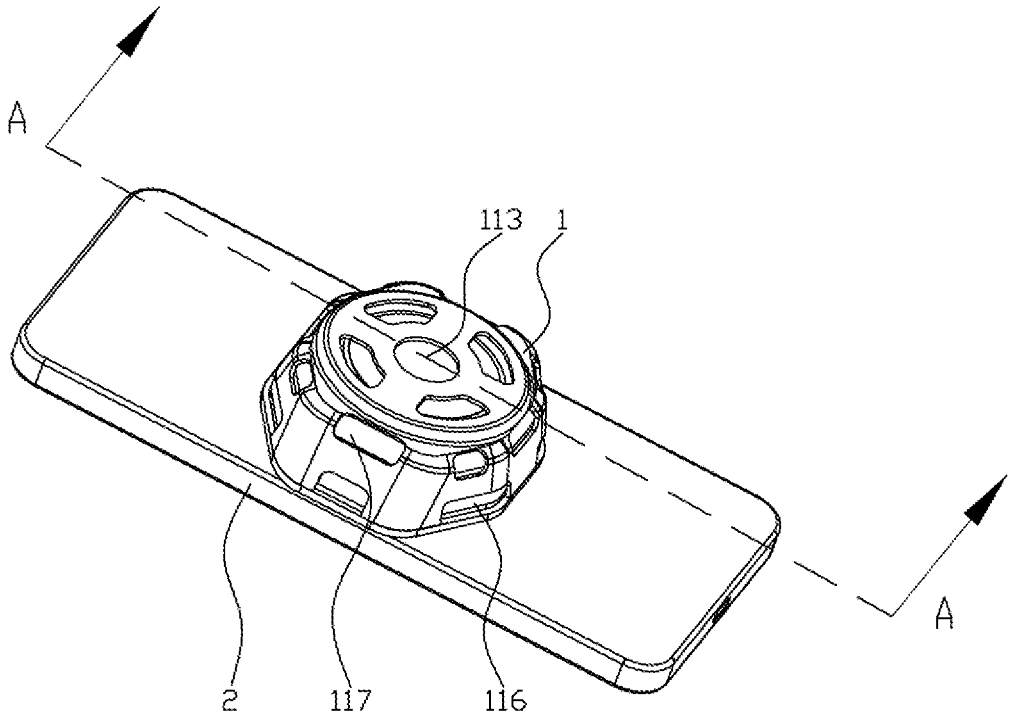
FIG. 1 is a diagram illustrating an overall structure of a mobile terminal with an integrated speaker according to an embodiment of the present application.
Figure 2:
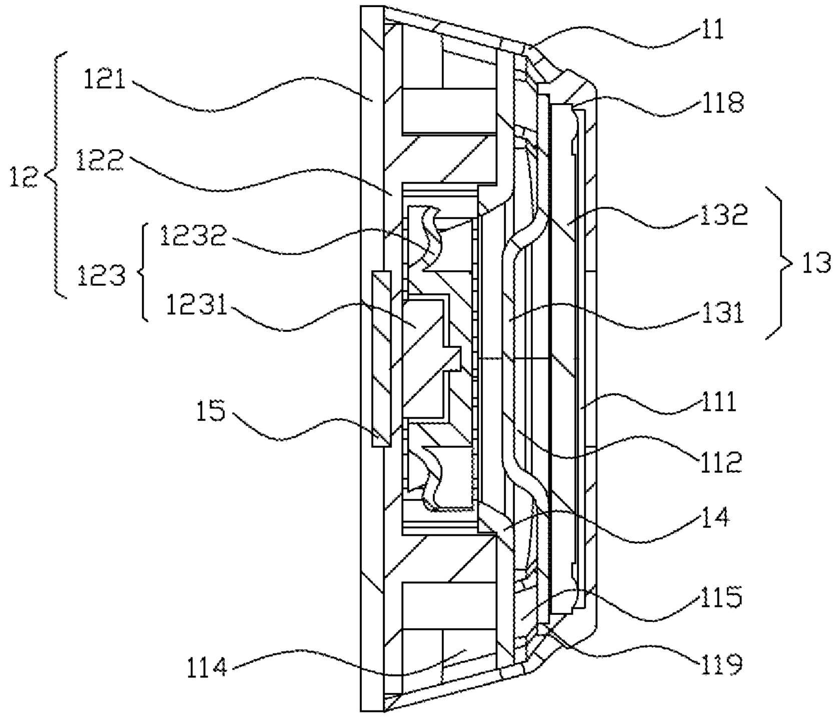
FIG. 2 is a sectional view of the integrated speaker along the A-A direction according to an embodiment of the present application.
Figure 3:
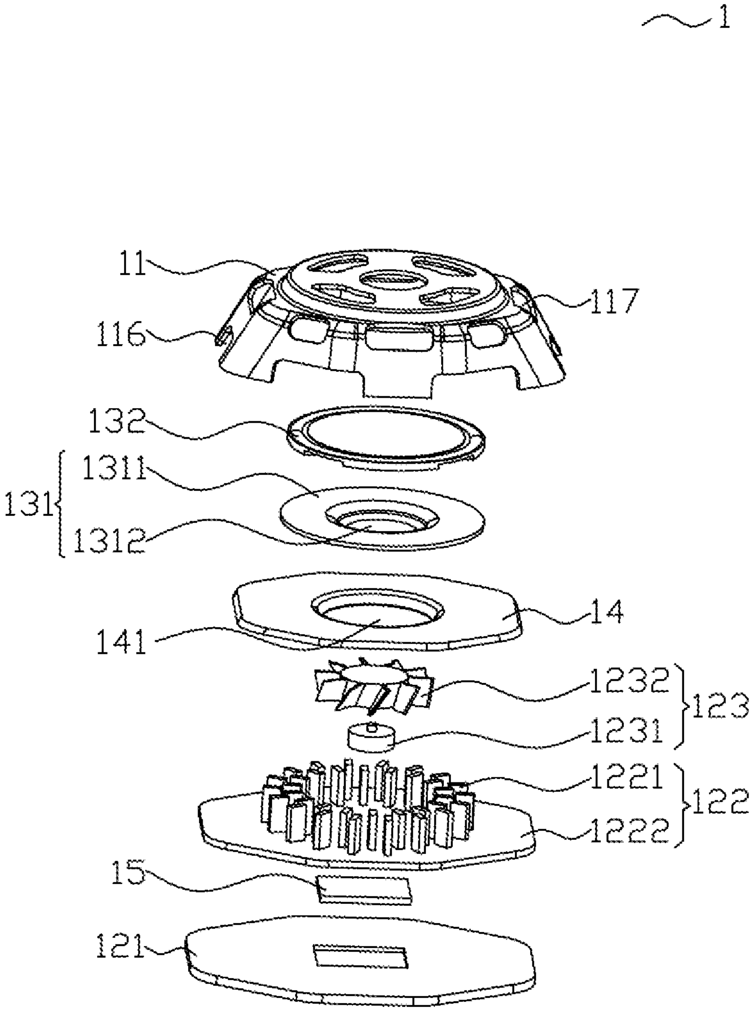
FIG. 3 is a diagram of a three-dimensional decomposition structure of the integrated speaker according to an embodiment of the present application.

As shown in FIGS. 1-3, this embodiment provides an integrated speaker 1 and a mobile terminal 2, and the mobile terminal 2 includes a mobile terminal body and the integrated speaker 1 attached to a rear cover of the mobile terminal 2. The mobile terminal body may be a cell phone, a tablet computer, and other similar terminal devices. The integrated speaker 1 includes a housing 11 with an accommodation cavity and a heat dissipation assembly 12 arranged in the accommodation cavity. The integrated speaker 1 further includes a sounding assembly 13 arranged in the accommodation cavity and spaced apart from the heat dissipation assembly 12. The sounding assembly 13 includes a sounding driver 132 arranged in the housing 11 and a cover plate 131 at least partially attached to the housing 11. A rear cavity 112 is formed between the cover plate 131 and the sounding driver 132, and a front cavity 111 is formed between the sounding driver 132 and the housing 11. The housing 11 is provided with a sound outlet hole 113 connected to the front cavity 111. The housing 11 is further provided with a partition plate 14 separating the accommodation cavity into a first cavity 114 and a second cavity 115, and a side wall of the housing 11 is provided with a first through-hole 116 connected to the first cavity 114 and a second through-hole 117 connected to the second cavity 115. The heat dissipation assembly 12 is arranged in the first cavity 114, and the heat dissipation assembly 12 is configured to drive air from the second cavity 115 to the first cavity 114. Alternatively, the heat dissipation assembly 12 is configured to drive air from the first cavity 114 to the second cavity 115.

In this embodiment, an integrated speaker 1 is provided on the one hand, and a mobile terminal 2 is provided with the above-mentioned integrated speaker 1 on the other hand. In the integrated speaker 1 of the present application, the sounding assembly 13 and the heat dissipation assembly 12 are arranged in the housing 11 with the accommodation cavity, so that the present application can both increase the audio effect of the mobile terminal and dissipate heat for the mobile terminal 2 after being attached to the mobile terminal 2. The heat dissipation assembly 12 is configured to dissipate heat from the mobile terminal 2, and the sounding assembly 13 is configured to improve the sound performance of the mobile terminal 2. The heat dissipation assembly 12 drives air through the first cavity 114 and the second cavity 115 to bring out the heat generated during the operation of the mobile terminal 2, so as to dissipate heat from the mobile terminal 2, When the sounding assembly 13 is operating, the sound is emitted through the sound outlet hole 113, and the rear cavity 112 and the front cavity 111 are configured to improve the sound quality of the sounding assembly 13 and improve the audio experience effect of the mobile terminal 2. In addition, the housing 11 can also play the role of protecting the heat dissipation assembly 12 and the sounding assembly 13, and the heat dissipation assembly 12 and the sounding assembly 13 sharing the housing 11 makes the overall structure of the integrated speaker 1 simplified. There are a plurality of first through-holes 116 and a plurality of second through-holes 117, which are arranged around the side wall of the housing 11. Each of the first through-holes 116 is actually a hole formed by a notch on the housing 11 near the opening and the heat dissipation assembly 12. There are a plurality of sound outlet holes 113 provided on the top of the housing 11, including a center hole arranged in a center of the top of the housing 11 and auxiliary holes arranged around the center hole. The sound outlet holes 113 are provided to improve the sound effect of the integrated speaker 1, and the solution in this embodiment is the optimal design approach. In other embodiments, the heat dissipation assembly 12 may drive air from the first cavity 114 to the second cavity 115. In other embodiments, it is also possible to provide a single first through-hole 116, a second through-hole 117, or a sound outlet hole 113, and the number of first through-hole 116, second through-hole 117, or sound outlet hole 113 is not limited in the present application. In other embodiments, the first through-hole 116 may also be a hole near the opening of the housing 11.

As shown in FIGS. 2-3, the heat dissipation assembly 12 includes a heat conducting plate 121 capped at the opening of the housing 11, a heat dissipation member 122 arranged on the heat conducting plate 121 and located in the first cavity 114, and a fan assembly 123 arranged on the heat dissipation member 122. The heat dissipation member 122 includes a base plate 1222 attached to the heat conducting plate 121 and a heat dissipation structure 1221 attached to the base plate 1222 and surrounding an outer side of the fan assembly 123. A plurality of gaps within the heat dissipation structure 1221. The fan assembly 123 is configured to drive air from the second cavity 115 to the first cavity 114 through the gaps.

In this embodiment, the heat conducting plate 121 is capped at the opening of the housing 11. The heat dissipation assembly 12 is attached to the heat conductor 15 and is located in the accommodation cavity of the housing 11. A side of the heat conducting plate 121 that is back from the housing 11 is attached to the mobile terminal 2. The heat generated by the mobile terminal 2 during operation is conducted to the heat dissipation member 122 through the heat conducting plate 121, and the fan assembly 123 drives the air in the first cavity 114 and the second cavity 115 to flow when the fan assembly 123 operates, and the heat generated by the mobile terminal 2 is brought out through the flowing air, thereby achieving heat dissipation of the mobile terminal 2. In this embodiment, the first cavity 114 and the first through-hole 116 form an air outlet channel, and the second cavity 115 and the second through-hole 117 form an air inlet channel. In other embodiments, it may also be that the first cavity 114 and the first through-hole 116 form an air inlet channel, and the second cavity 115 and the second through-hole 117 form an air outlet channel.

Figure 4:
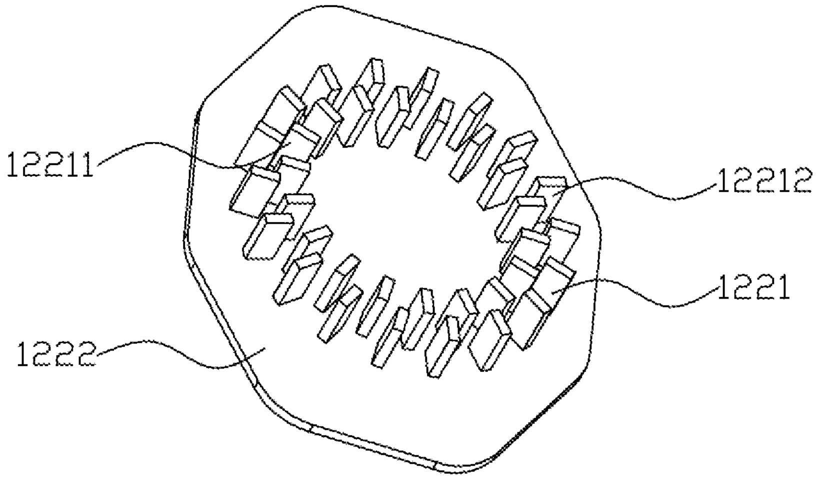
FIG. 4 is a structural diagram of a heat dissipation member in the integrated speaker according to an embodiment of the present application.

As shown in FIGS. 3-4, the heat dissipation structure 1221 includes at least two first heat dissipation plates 12211 and at least two second heat dissipation plates 12212. The at least two first heat dissipation plates 12211 and the at least two second heat dissipation plates 12212 are spaced apart and around an outer side of the fan assembly 123. An end of each first heat dissipation member 12211 away from the base plate 1222 and an end of each second heat dissipation member 12212 away from the base plate 1222 are abutted against the partition plate 14, respectively.

In this embodiment, a plurality of first heat dissipation plates 12211 and a plurality of second heat dissipation plates 12212 are provided on the outer side of the fan assembly 123. The first heat dissipation plates 12211 and second heat dissipation plates 12212 are rectangular and extended in the radial direction of the fan assembly 123. The partition plate 14 is arranged in the accommodation cavity and is abutted against each of the first heat dissipation plates 12211 and second heat dissipation plates 12212. The air circulation channels are formed between the adjacent first heat dissipation members 12211 and the partition plate 14, and the air circulation channels are also formed between the adjacent second heat dissipation members 12212 and the partition plate 14, so that when the fan assembly 123 is in operation, the air circulates through the channels to carry away the heat conducted by the heat conducting plate 121 to the heat dissipation member 122.

As shown in FIG. 4, the first heat dissipation plates 12211 are staggered with the second heat dissipation plates 12212, and each second heat dissipation plate 12212 is provided around an outer side of each first heat dissipation plate 12211. In this embodiment, by providing the staggered first heat dissipation plates 12211 and the second heat dissipation plates 12212, and arranging the second heat dissipation plate 12212 around the outer side of each first heat dissipation plate 12211, the air has an increased contact surface with the heat dissipation member 122 after entering the first cavity 114 to absorb more heat, thus improving the heat dissipation effect of the heat dissipation assembly 12.

As shown in FIGS. 2-3, the partition plate 14 is provided with a third through-hole 141 opposite to the position of the fan assembly 123 and a flange 142 extending from an edge of the third through-hole 141 toward the heat dissipation assembly 12. The flange 142 is abutted against the first heat dissipation plate 12211, and the third through-hole 141 is connected to the first cavity 114 and the second cavity 115.

In this embodiment, the first cavity 114 and the second cavity 115 are connected to the third through-hole 141 to allow air to circulate through the first cavity 114 and the second cavity 115, so that the air can carry away the heat conducted to the heat dissipation plate.

As shown in FIGS. 2-3, the partition plate 14 is provided with a flange 142 extending from an edge of the third through-hole 141 toward the heat dissipation assembly 12, and the flange 142 is abutted against the first heat dissipation plate 12211. In this embodiment, the flange 142 is configured to direct the airflow to the first cavity 114 on the one hand, to facilitate the assembly of the partition plate 14 with the first heat dissipation plates 12211, and to limit the partition plate on the other hand.

As shown in FIG. 3, the cover plate 131 has a convex portion 1311 projecting toward the heat dissipation assembly 12 and corresponding to the position of the third through-hole 141, and a fitting portion 1312 extending outwardly from an outer edge of the convex portion 1311 and fixed to the housing 11. The convex portion 1311 is extended at least partially toward the third through-hole 141.

In this embodiment, the housing 11 and a part of the fitting portion 1312 are partly fixed together. The rear cavity 112 of the sounding assembly 13 is formed among the portion of the fitting portion 1312 that is not fitted to the housing 11, the convex portion 1311, and the sounding driver 132, and the rear cavity 112 can serve to improve the sound quality of the sounding assembly 13 when the sounding assembly 13 is in operation. The convex portion 1331 is partially inserted into the third hole 141 to guide the air to the first cavity 114 on the one hand, and to increase the volume of the rear cavity 112 on the other hand, so that the rear cavity 112 can better improve the sound quality of the sounding assembly 13.

As shown in FIGS. 2-3, a heat conducting member 15 is further provided between the base plate 1222 and the housing 11, which is made of heat conductive material. In this embodiment, the heat conducting member 15 is configured to quickly conduct the heat generated by the mobile terminal 2 to the heat dissipation member 122, and a fan base 1231 and fan blades 1232 of the fan assembly 123 are rotatably connected. The fan blades 1232 continuously rotate to make the airflow quickly take away heat, thereby reducing the temperature of the mobile terminal 2 itself.

As shown in FIG. 2, an inner side of the housing 11 is provided with a first limiting slot 118, and a second limiting slot 119 surrounding an outer side of the first limiting slot 118. The sounding driver 132 is embedded in the first limiting slot 118 and the cover plate 131 is embedded in the second limiting slot 119. In this embodiment, the first limiting slot 118 is configured to limit the sounding driver 132, and the second limiting slot 119 is configured to limit the cover plate 131, thereby preventing displacement of the sounding driver 132 and the cover plate 131, which may affect the overall use of the integrated speaker 1.

Described above are only embodiments of the present application, and it should be noted that, for those of ordinary skill in the art, improvements made without departing from the conceptual essence of the present application shall fall within the protection scope of the present application.

What is claimed is:

1. An integrated speaker, comprising:

a housing with an accommodation cavity;

a heat dissipation assembly provided in the accommodation cavity;

a sounding assembly provided in the accommodation cavity and spaced from the heat dissipation assembly, comprising:

a sounding driver provided in the housing; and a cover plate at least partially attached to the housing, wherein a rear cavity is formed between the cover plate and the sounding driver, and a front cavity is formed between the sounding driver and the housing; wherein the housing is provided with a sound outlet hole connected to the front cavity, and a partition plate separating the accommodation cavity into a first cavity and a second cavity; a side wall of the housing is provided with a first through-hole connected to the first cavity, and a second through-hole connected to the second cavity; the heat dissipation assembly is provided in the first cavity; the heat dissipation assembly is configured to drive air from the second cavity to the first cavity, or, the heat dissipation assembly is configured to drive air from the first cavity to the second cavity; the heat dissipation assembly comprises a heat conducting plate capped at an opening of the housing, a heat dissipation member provided on the heat conducting plate and located in the first cavity, and a fan assembly provided on the heat dissipation member; wherein the heat dissipation member comprises a base plate attached to the heat conducting plate and a heat dissipation structure attached to the base plate and surrounding an outer side of the fan assembly; a plurality of gaps are formed in the heat dissipation structure; and the fan assembly is configured to drive air from the second cavity to the first cavity through the plurality of gaps.

2. The integrated speaker of claim 1, wherein the heat dissipation structure comprises at least two first heat dissipation plates and at least two second heat dissipation plates, wherein the at least two first heat dissipation plates and at least two second heat dissipation plates are spaced apart and around the outer side of the fan assembly; an end of each first heat dissipation plate away from the partition plate and an end of each second heat dissipation plate away from the base plate are abutted against the partition plate.

3. The integrated speaker of claim 2, wherein the first heat dissipation plates are staggered with the second heat dissipation plates, and the second heat dissipation plates are provided around an outer side of each first heat dissipation plate.

4. The integrated loudspeaker of claim 2, wherein the partition plate is provided with a third through-hole opposite to a position of the fan assembly, wherein the third through-hole is connected to the first cavity and the second cavity.

5. The integrated speaker of claim 4, wherein the partition plate further comprises a flange extending from an edge of the third through-hole towards the heat dissipation assembly, wherein an outer side of the flange is abutted against an inner side of each of the first heat dissipation plates.

6. The integrated speaker of claim 4, wherein the cover plate is provided with a convex portion projecting towards the heat dissipation assembly and corresponding to a position of the third through-hole, and a fitting portion extending outwardly from an outer edge of the convex portion and fixed to the housing, wherein the convex portion is extended at least partially into the third through-hole.

7. The integrated speaker of claim 1, wherein a heat conducting member is provided between the base plate and the housing, and the heat conducting member is made of heat conductive material.

8. The integrated speaker of claim 1, wherein a first limiting slot is provided on an inner side of the housing and a second limiting slot is provided around an outer side of the first limiting slot; the sounding driver is embedded in the first limiting slot, and the cover plate is embedded in the second limiting slot.

9. A mobile terminal, comprising the integrated speaker of claim 1, wherein the integrated speaker is attached to a rear cover of the mobile terminal.

* * * * *